UNITED STATES PATENT OFFICE.

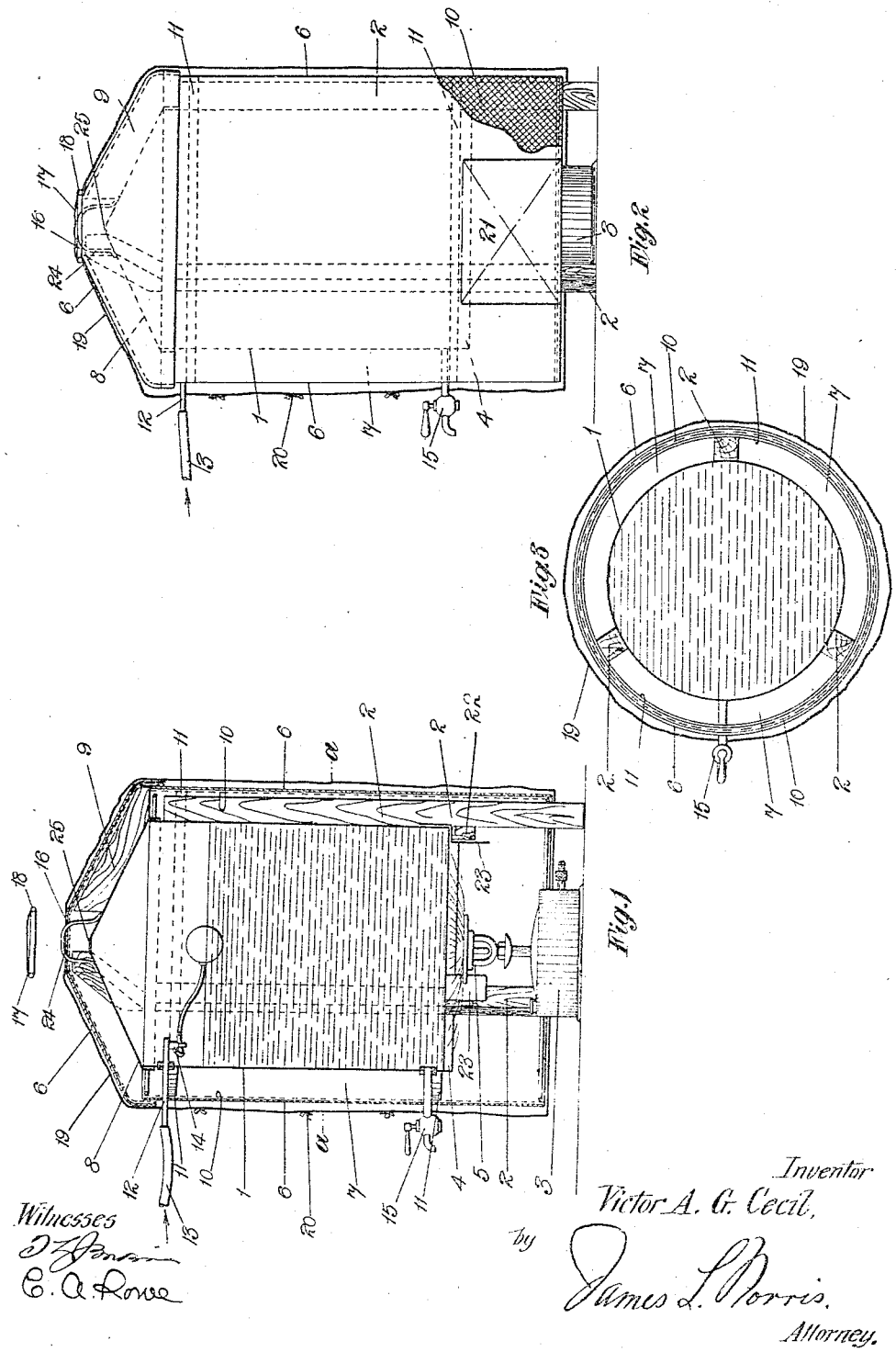

VICTOR ALEXANDER GASCOYNE CECIL, OF COLCHESTER, ENGLAND.

WATER-HEATER.

1,285,036.          Specification of Letters Patent.          Patented Nov. 19, 1918.

Application filed August 27, 1917.   Serial No. 188,486.

*To all whom it may concern:*

Be it known that I, VICTOR ALEXANDER GASCOYNE CECIL, a subject of the King of Great Britain, residing at Colchester, Essex, England, have invented certain new and useful Improvements in or Connected with Water-Heaters, of which the following is a specification.

My invention relates to water heating apparatus chiefly intended for domestic purposes, such as for obtaining and maintaining a supply of hot water for a bath, or for use in small quantities from time to time as required, and the object of the invention is to provide novel containing means for heating the water to any desired temperature, and wherein the heating means may then be partially or wholly shut off, and caused to retain its heated temperature for a considerable length of time, whereby a supply of hot water is kept ready for use at a very small heating expense.

The invention consists of a water heating apparatus in which the water container is provided with a non-conducting jacket, so arranged that an annular space is formed between the container casing and the non-conducting jacket, in such manner that the products of combustion and heated air can rise and pass up around the container through the space between the said container and the jacket and impart heat to the vessel or container in addition to the heat which is derived from the heating means disposed and acting directly on the under side of the container, the arrangement including means for retaining the heat around the container after the heating means has been shut off.

The improved device also consists of certain novel details of construction and arrangement of parts which will be more fully hereinafter described. In the accompanying drawings a preferred form of the improved apparatus is shown, and in the drawings:—

Figure 1 is an elevation in section of the apparatus complete.

Fig. 2 is an elevation with a portion broken away in order to show the wire netting lining of the non-conducting jacket, the outer impermeable or air proof cover being shown in section; and Fig. 3 is a sectional plan on the line $a\ a$ of Fig. 1.

According to the improved construction I mount a drum-like vessel or water container 1 vertically upon legs or supports 2, 2, 2 and arrange an oil stove 3, underneath. Any other form of gas or other source of heating may however be employed. The bottom edge of the drum 1 may be provided with a depending flange 4 or flanges to form an inclosing chamber around the burner 5.

The legs or supports 2, are continued upward as projecting ribs around the sides of the container 1, and around these ribs I fit a tube or cylinder 6 of felt, asbestos or other suitable non-conductor of heat in such manner that an annular space 7 between the felt or other jacket 6 and the container 1 is formed for the products of combustion and heated air derived from the lighted burner 5 to circulate around the container 1 and pass upward to the top or cover 8 which is also provided with a spaced jacket 6 of felt or other suitable non-conducting material, supported on wooden bars 9 and depending around the sides so as to overlap the top edge of the jacket around the container.

The felt or material 6 is connected to a wire netting cage 10 or other support for fitting the non-conducting jacket 6 to the sides or around the container 1 by suitable means, and in the construction shown, the wire cage 10 is secured to the supports 2 by ring bands 11, or the cage may rest upon projections in such a manner that the hot fumes or products of combustion and heated air may have access to the inclosed space between the jacket and water container as before stated.

12 is the inlet pipe which may be connected by a union nut joint to the water service, but in the arrangement shown in the drawing and which I prefer to adopt, the inlet pipe is detachably connected by a flexible or rubber tubing 13 to any source of supply such as a lavatory basin tap, or the water supply tap of a bath tub. The inlet pipe 12 is controlled by a ball cock valve 14 so that a constant supply is automatically insured. 15 is the draw off tap preferably of the plug type, to insure a good flow of hot water from the container into say a bath tub over which the apparatus may be placed or fitted. 16 is the circular outlet or opening before referred to, which is formed in the jacket covering 6 of the lid 8, the supports 9 at that part terminating at a short distance from the apex of the lid as shown, and 17 is a detachable cap of oilskin or the like, the outer edge 18 of which cap forms a close fit when laid over the opening for the purpose before described. 19 is a covering of oilskin or other impermeable material, which is placed over the apparatus to inclose it and an opening is left at the top part to correspond with the opening in the non-conducting jacket. The overlapping edges of this loose cover are secured by any suitable means, such as fasteners, tapes or the like. The jacket 6 and the cover 19 terminate a short distance above the ground line for free access of air to the burner. 21 is a portion of the jacket which may be raised as a door for the entry or removal or lighting of the lamp.

22 are wooden ledges fixed to the supports or legs and upon which the container rests, the ledges being protected by metal strips 23. 24 is an ordinary handle by which the lid and its jacket may be lifted off for inspection or cleaning the container. A small hole 25 may be formed in the lid if desired as a safety vent for any pressure of steam which may accumulate.

What I do claim as my invention, and desire to secure by Letters Patent, is:—

A water heating apparatus comprising a container provided with legs and with supports, a non-conducting jacket arranged around the container on said supports in such a manner that an annular space is formed between the container casing and the non-conducting jacket for the passage and storage of hot air and products of combustion, a removable lid provided with spacing supports, a non-conducting jacket, and an outlet aperture for the fumes and products of combustion while the lamp or other source of heat placed or arranged under the container is alight, a cap for closing said outlet when the heated air in the annular chamber is to be stored up for after use, an inlet supply preferably automatically controlled by a ball valve, and a draw off tap, the whole being inclosed by an impermeable cover.

In testimony whereof I have hereunto set my hand in presence of two subscribing witnesses.

VICTOR ALEXANDER GASCOYNE CECIL.

Witnesses:
WM. O. MORAN,
J. M. BERTHELOT.